United States Patent
Zou

(10) Patent No.: US 11,265,314 B1
(45) Date of Patent: Mar. 1, 2022

(54) CODE SCANNING JUMP

(71) Applicant: ALIPAY (HANGZHOU) INFORMATION TECHNOLOGY CO., LTD., Zhejiang (CN)

(72) Inventor: Shengqun Zou, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/359,980

(22) Filed: Jun. 28, 2021

(30) Foreign Application Priority Data

Sep. 1, 2020 (CN) .......................... 202010903205.6

(51) Int. Cl.
*H04L 29/08* (2006.01)
*H04L 29/06* (2006.01)

(52) U.S. Cl.
CPC ...... *H04L 63/0853* (2013.01); *H04L 63/0815* (2013.01); *H04L 63/10* (2013.01); *H04L 63/20* (2013.01)

(58) Field of Classification Search
CPC . H04L 63/0853; H04L 63/0815; H04L 63/10; H04L 63/20
See application file for complete search history.

(56) References Cited

U.S. PATENT DOCUMENTS

| 2008/0133540 | A1* | 6/2008 | Hubbard | ............. | H04L 63/1483 |
| 2009/0265786 | A1* | 10/2009 | Xie | ....................... | G06F 21/564 |
| | | | | | 726/24 |
| 2013/0282739 | A1 | 10/2013 | Anderson et al. | | |
| 2014/0181256 | A1* | 6/2014 | Trifa | ..................... | H04L 67/327 |
| | | | | | 709/218 |
| 2016/0217121 | A1* | 7/2016 | Luo | ................... | G06F 16/24522 |

FOREIGN PATENT DOCUMENTS

| CN | 101727447 | 6/2010 |
| CN | 102238263 | 11/2011 |
| CN | 102902780 | 1/2013 |
| CN | 103793461 | 5/2014 |
| CN | 103793462 | 5/2014 |
| CN | 106649478 | 5/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

*Primary Examiner* — Noura Zoubair
(74) *Attorney, Agent, or Firm* — Fish & Richardson P.C.

(57) ABSTRACT

One or more embodiments of the present specification relate to a data processing method, apparatus, device, and system for code scanning jumps. An example method includes receiving scan data resulting from a client application having been used to scan an identification code, in which the identification code and the client application have been created under different platforms. A domain name is obtained from the scan data, and a target regular expression corresponding to the domain name is obtained from a regular expression library. A jump rule string corresponding to the identification code is determined based on the target regular expression and a resource path of the domain name of the identification code, and a jump address corresponding to the jump rule string is queried from a rule library that includes mapping relationships between jump rule strings and jump addresses.

14 Claims, 5 Drawing Sheets

CODE SCANNING JUMP

CROSS-REFERENCE TO RELATED APPLICATIONS

This application claims priority to Chinese Patent Application No. 202010903205.6, filed on Sep. 1, 2020, which is hereby incorporated by reference in its entirety.

TECHNICAL FIELD

The present specification relates to the field of computer technologies, and in particular, relates to data processing methods, apparatuses, devices, and systems for code scanning jump.

BACKGROUND

A client can scan a code to jump to an applet or a specified page for payment or other service operations. Generally, a specified application can be used for code scanning. When a generator of an identification code (such as a two-dimensional code) and an application used for code scanning are not the same platform, a consideration may be how to jump to a specified jump address through scanning by using the application. Generally, when an identification code is generated by a third party, scanning mapping can be used for code scanning. A relationship between a code value of each code and a jump address may be stored through mapping, resulting in a relatively large workload, and cyclic traversal can also be used in the matching process, resulting in relatively long matching time.

SUMMARY

An objective of embodiments of the present specification is to provide data processing methods, apparatuses, devices, and systems for code scanning jump, to improve data processing efficiency for code scanning jump and jump accuracy.

According to an aspect, the embodiments of the present specification provides a data processing method for code scanning jump. The method includes the following: a domain name in a code value of an identification code in a scanning request is obtained, where the identification code in the scanning request and an application that sends the scanning request do not belong to the same platform; a target regular corresponding to the domain name is obtained from a regular library (or regular database), where the regular library includes multiple regulars, each regular is determined and obtained based on a resource path of a domain name of a different type of identification code, and each regular includes a to-be-matched character; a jump rule string corresponding to the identification code is determined based on the target regular and a resource path of the domain name of the identification code; and a jump address corresponding to the jump rule string is queried from a rule library, where the rule library includes mapping relationships between jump rule strings and jump addresses.

According to another aspect, the present specification provides a data processing apparatus for code scanning jump, including: a domain name acquisition module, configured to obtain a domain name in a code value of an identification code in a scanning request, where the identification code in the scanning request and an application that sends the scanning request do not belong to the same platform; a regular matching module, configured to obtain a target regular corresponding to the domain name from a regular library, where the regular library includes multiple regulars, each regular is determined and obtained based on a resource path of a domain name of a different type of identification code, and each regular includes a to-be-matched character; a rule matching module, configured to determine a jump rule string corresponding to the identification code based on the target regular and a resource path of the domain name of the identification code; and a jump address determining module, configured to query a jump address corresponding to the jump rule string from a rule library, where the rule library includes mapping relationships between jump rule strings and jump addresses.

According to still another aspect, the embodiments of the present specification provide a data processing device for code scanning jump, including at least one processor and at least one memory configured to store processor-executable instructions. The processor implements the previously described data processing method for code scanning jump when executing the instructions.

According to a yet another aspect, the embodiments of the present specification provide a data processing system for code scanning jump, including a server and multiple clients. An application for code scanning is installed in the client, and the client scans an identification code by using the application and sends a scanning request to the server, where the scanning request includes a code value of the scanned identification code; and the server includes at least one processor and at least one memory configured to store processor-executable instructions. The processor implements the previously described data processing method for code scanning jump when executing the instructions; and the server is configured to process the scanning request sent by the client by using the application and returns a jump address corresponding to the identification code, to enable the application in the client to jump to the address corresponding to the identification code.

According to the data processing methods, apparatuses, devices, and systems for code scanning jump provided in the present specification, identification codes are pre-classified based on resource paths of domain names of the identification codes, and a regular library is configured based on a classification result. When an identification code is scanned, a code value of the identification code can be obtained, and a target regular corresponding to a domain name in the code value of the identification code can be obtained based on the domain name. A resource path of the domain name of the identification code can be compared with the target regular to determine a jump rule string corresponding to the identification code, and then a rule library can be queried to obtain a jump address corresponding to the jump rule string. The regular library is configured by classifying the identification codes, which greatly reduces the quantity of configured regulars, and further reduces a data processing amount of subsequent regular loading and matching, thereby improving code scanning mapping and parsing efficiency. A mapping relationship between the identification code and the jump address can be accurately obtained by querying the rule library, thereby improving code scanning parsing accuracy.

BRIEF DESCRIPTION OF DRAWINGS

To describe technical solutions in the embodiments of the present specification or in the existing technology more clearly, the following briefly describes the accompanying drawings for describing the embodiments or the existing technology. Clearly, the accompanying drawings in the following descriptions show merely some embodiments of the present specification, and a person of ordinary skill in the art can still derive other drawings from these accompanying drawings without creative efforts.

DESCRIPTION OF EMBODIMENTS

To make a person skilled in the art better understand the technical solutions in the present specification, the following clearly and comprehensively describes the technical solutions in the embodiments of the present specification with reference to the accompanying drawings in the embodiments of the present specification. Clearly, the described embodiments are merely some rather than all of the embodiments of the present specification. All other embodiments obtained by a person of ordinary skill in the art based on the embodiments of the present specification without creative efforts shall fall within the protection scope of the present specification.

With the development of computer Internet technologies, more and more users use clients to scan codes for service processing, for example, scan codes to pay, scan codes to order meals, etc. A scanned identification code can be a graphic code such as a two-dimensional code or a barcode. Generally, a specified application can be used for code scanning. With the continuous development of computer technologies, identification codes are increased in type and quantity, more and more users develop and create identification codes, and a developer of an identification code and an application that scans the identification code may not belong to the same platform. For scanning of such a third-party aggregated identification code, a path of the identification code is not in an application platform that scans the code, and the application jumps to a specified page or an applet after scanning the code. In this case, mapping configuration may need to be performed in advance. When a data volume is relatively high, a performance problem may exist and a workload is relatively large.

Figure 1:
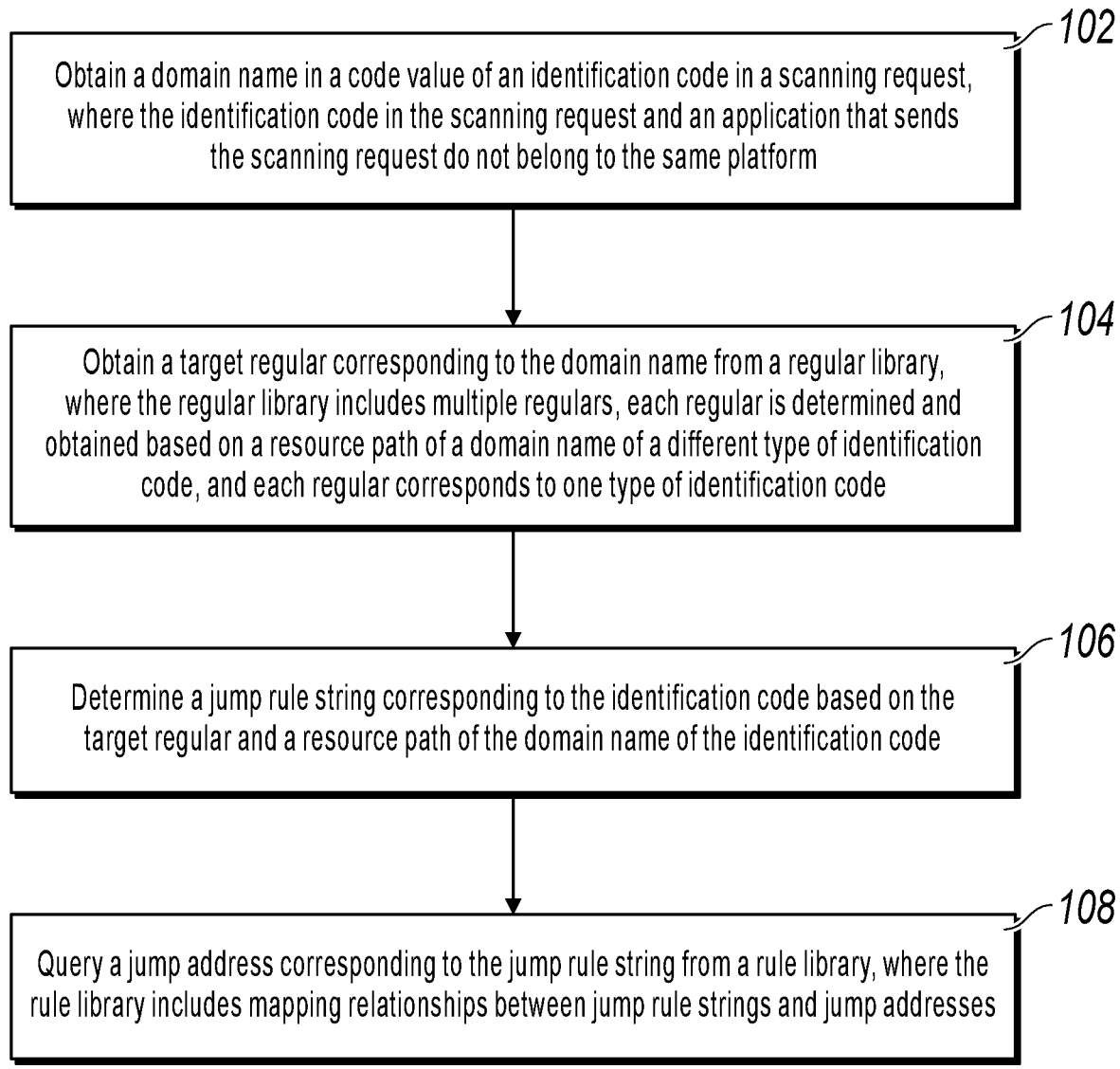
FIG. 1 is a schematic flowchart illustrating embodiments of a data processing method for code scanning jump, according to embodiments of the present specification.

FIG. 1 is a schematic flowchart illustrating embodiments of a data processing method for code scanning jump, according to embodiments of the present specification. Although the present specification provides operation steps of methods or structures of apparatuses shown in the following embodiments or the accompanying drawings, based on conventional or non-creative efforts, the methods or the apparatuses can include more operation steps or modules/units, or fewer operation steps or modules/units after some operation steps or modules/units are combined. For steps or structures that have no necessary logical causal relationship, an execution sequence of the steps or module structures of the apparatuses is not limited to the execution sequences or the module structures shown in the embodiments or the accompanying drawings of the present specification. When the methods or the module structures are applied to an actual apparatus, server, or terminal product, the methods or the module structures can be executed based on the sequences of the methods or the module structures shown in the embodiments or the accompanying drawings, or can be executed in parallel (for example, in a parallel-processor or multi-thread processing environment, or even in an implementation environment including distributed processing and server clustering).

A specific embodiment is shown in FIG. 1. In embodiments of the data processing method for code scanning jump provided in the present specification, the method can be applied to a device such as a computer, a tablet computer, or a server, and the method can include the following steps.

Step 102: Obtain a domain name in a code value of an identification code in a scanning request, where the identification code in the scanning request and an application that sends the scanning request do not belong to the same platform.

In a specific implementation process, a user can scan an identification code by using an application that can scan an identification code and installed in a client such as a smartphone or a tablet computer, and send a scanning request to a server. The code scanning request can include a code value of the identification code scanned by using the application. The code value of the identification code can include a domain name corresponding to the identification code, or can include a name, a brief description, etc. of the identification code. Implementations are not specifically limited in the embodiments of the present specification. After receiving the scanning request sent by the client by using the application, the server can obtain the domain name in the code value of the identification code in the scanning request. The domain name can be a name of a certain computer or computer group on the Internet including a string of character strings separated by points. The identification code can be a graphic code including certain information, such as a two-dimensional code or a barcode. A specific form of the identification code is not specifically limited in the embodiments of the present specification.

In addition, in the embodiments of the present specification, the identification code is not created by a platform that the application for code scanning belongs to. In other words, a developer or creator of the identification code and the application that scans the identification codes do not belong to the same platform. That is, the identification code in the embodiments of the present specification is a third-party aggregated identification code.

Step 104: Obtain a target regular corresponding to the domain name from a regular library, where the regular library includes multiple regulars, each regular is determined and obtained based on a resource path of a domain name of a different type of identification code, and each regular includes a to-be-matched character.

In a specific implementation process, identification codes can be pre-classified, and a regular corresponding to each type of identification code can be created based on a classification result. For example, the identification codes can be pre-classified based on resource paths of the multiple identification codes, to create a regular library, so that the created regular can well represent a resource path of each type of identification code for subsequent accurate jump. The identification codes used to create the regular library each can be a third-party aggregated identification code or can be an identification code created by a platform that an application for code scanning belongs to, and can be specifically selected based on actual needs. The resource path can be understood as a specific path corresponding to a domain name of an identification code, and the resource path can represent a specific storage location of the identification code information. For example, https://sh.1234567.com/Wap/Index/pay/kind/2/merchant/563296/sid/427287/subid/0 can represent a resource path of an identification code. Identification codes can be classified based on resource paths of domain names of the identification codes. For example, identification codes with similar resource paths can be classified under one type. Regulars corresponding to the identification codes can be configured based on the resource paths of the various types of identification codes. Each regular can correspond to one type of identification code. The regular can be understood as a regular expression, can describe a character string matching pattern, and can be used to check whether a string includes a certain substring, replace a matched substring, or extract a substring that satisfies a certain condition from a certain string. Each regular can include a domain name of a code value of one type of identification code and a to-be-matched character. Generally, the to-be-matched character can represent a variable character in the regular. The to-be-matched character can be replaced based on each identification code, instead of giving a specific regular expression. The regular in the embodiments of the present specification can represent one type of identification code. For example, in a regular "https://sh.1234567.com/Wap/Index/pay/kind/2/merchant/[a-zA-Z0-9]+", "https://sh.1234567.com/" can represent a domain name, and "[a-zA-Z0-9]+" can represent a to-be-matched character. The to-be-matched character "[a-zA-Z0-9]+" in the regular can be replaced based on a code value of an actual identification code. That is, the to-be-matched character in the regular is not fixed.

In some embodiments of the present specification, before the obtaining a target regular corresponding to the domain name from a regular library, the method further includes the following: resource paths of domain names of multiple identification codes are obtained; the identification codes are classified based on the resource paths of the multiple identification codes, where identification codes with resource paths including a common path are classified under one type; and a regular corresponding to each type of identification code is configured based on a common path in resource paths of identification codes under each type, to create the regular library.

In a specific implementation process, resource paths of domain names of multiple identification codes can be obtained. The multiple identification codes each can be an identification code corresponding to an applet application residing on a platform that an application that scans the identification code belongs to, or can be an identification code obtained by using a sampling method, a market investigation method, etc. Implementations are not specifically limited in the embodiments of the present specification. The resource paths of the domain names of the multiple identification codes are analyzed, to classify identification codes including a common path under one type. Identification codes under each type have the same domain name. Then, a regular corresponding to each type of identification code is configured based on a common path in resource paths of the identification codes under each type. All characters of the common path or some characters of the common path in the resource paths of the identification codes under each type can be used as a regular of the type, and different paths in the resource paths of the identification codes under each type can be represented by using to-be-matched characters.

For example, a resource path of a domain name of identification code 1 is https://sh.1234567.com/Wap/Index/pay/kind/2/merchant/563296/sid/427287/subid/0 \, a resource path of a domain name of identification code 2 is https://sh.1234567.com/Wap/Index/pay/kind/2/merchant/563296/sid/427287/subid/1 \, and a resource path of a domain name of identification code 3 is https://sh.1234567.com/Wap/Index/pay/kind/2/merchant/563296/sid/427287/subid/2 \. It can be seen that identification codes 1, 2, and 3 have the same domain name and have a common path. The common path is https://sh.1234567.com/Wap/Index/pay/kind/2/merchant/563296/sid/427287/subid/. Identification codes 1, 2, and 3 can be classified under one type, and one regular can be configured for identification codes 1, 2, and 3. The regular can be configured as https://sh.1234567.com/Wap/Index/pay/kind/[a-zA-Z0-9]+/merchant/[a-zA-Z0-9]+. Certainly, a regular configuration form can be further adjusted as needed. For example, the regular corresponding to identification codes 1, 2, and 3 can be configured as https://sh.1234567.com/Wap/Index/pay/kind/2/merchant/[a-zA-Z0-9]+, or can be configured as https://sh.1234567.com/Wap/Index/pay/kind/[a-zA-Z0-9]+. A specific regular configuration method is not limited in the embodiments of the present specification.

It is worthwhile to note that different regulars can be obtained by using different identification code classification methods. Because each identification code may belong to multiple identification code types, each identification code may correspond to multiple regulars.

Identification codes are classified based on commonness of resource paths of domain names of the identification codes, thereby reducing the quantity of configured regulars and a configuration workload, improving regular matching efficiency, and further improving efficiency of code scanning jump.

After the domain name in the scanning request is obtained, the domain name can be matched with the regulars in the regular library to obtain the target regular corresponding to the domain name. For example, a regular including the domain name can be used as the target regular of the domain name. If multiple regulars include the domain name, one of the multiple regulars can be selected as the target regular. For example, a regular corresponding to a large code scanning jump quantity in the multiple matched regulars can be used as the target regular of the domain name based on historical code scanning jump data.

In some embodiments of the present specification, the obtaining a target regular corresponding to the domain name from a regular library includes: obtaining primarily-selected regulars that match the domain name from the regular library; and matching the primarily-selected regulars with the resource path of the domain name of the identification code to obtain the target regular that matches the identification code.

Generally, each domain name can correspond to one or more regulars, and different corresponding relationships between domain names and regulars can be pre-stored. For example, one platform may develop multiple identification codes for different services. Domain names of these identification codes are the same, but service parameters after the domain names may be different. After the scanning request is received and the domain name in the code value of the identification code in the scanning request is obtained, the primarily-selected regulars corresponding to the domain name can be obtained from the regular library. For example, regulars including the obtained domain name of the identification code in the regular library can be used as the primarily-selected regulars. Both the primarily-selected regular and the domain name of the identification code include character strings. After the primarily-selected regulars corresponding to the domain name are obtained, the primarily-selected regulars can be matched with the resource path of the domain name of the identification code, and a successfully matched primarily-selected regular can be used as the target regular. If there are multiple matched primarily-selected regulars, a primarily-selected regular with a high matching degree can be used as the target regular.

In some embodiments of the present specification, when the primarily-selected regulars are matched with the resource path in the code value of the identification code, the method includes the following: the primarily-selected regulars are sequentially compared with the resource path in the code value of the identification code based on priorities corresponding to the primarily-selected regulars starting from a primarily-selected regular with a high priority until the matching succeeds, and a successfully matched primarily-selected regular is used as the target regular.

In a specific implementation process, different levels of priorities can be preset for the primarily-selected regulars, and the primarily-selected regulars are matched with the domain name of the identification code in the scanning request in descending order of the priorities until the matching succeeds, and the successfully matched primarily-selected regular is used as the target regular. For example, the primarily-selected regulars can be sorted in descending order of the priorities, and then traveral matching is performed starting from a primarily-selected regular with a high priority. The traversing ends when the matching succeeds, and the successfully matched primarily-selected regular is used as the target regular. The priorities of the primarily-selected regulars can be configured based on actual service needs. For example, based on user feedbacks in historical code scanning jump data, a high priority can be set for a regular with a high jump accuracy rate, and a low priority can be set for a regular with a low jump accuracy rate. Alternatively, based on the historical code scanning jump data, the priorities of the primarily-selected regulars are set based on jump quantities, where a regular with a large jump quantity has a high priority. The primarily-selected regular matching is performed based on the priorities, which can improve a regular matching success rate and matching efficiency, further improve efficiency of code scanning jump, and reduce the quantity of matched regulars.

In some embodiments of the present specification, a method for setting the priorities of the primarily-selected regulars includes the following: the priorities of the primarily-selected regulars is preset based on matching ranges of the primarily-selected regulars, where a larger matching range indicates a lower priority.

In a specific implementation process, each regular corresponds to a different matching range. For example, regular 1 is https://sh.1234567.com/Wap/Index/pay/kind/2/merchant/[a-zA-Z0-9]+, and regular 2 is https://sh.1234567.com/Wap/Index/pay/kind/[a-zA-Z0-9]+. It can be seen that a matching range of regular 2 is greater than a matching range of regular 1. In the embodiments of the present specification, the priorities of the primarily-selected regulars can be set based on the matching ranges of the primarily-selected regulars, where a larger matching range indicates a lower priority. As such, it can be ensured that a regular with a small matching range can be matched, and regular matching accuracy can also be improved. Generally, a regular with a smaller matching range has a higher matching degree with the resource path of the domain name of the identification code.

Step 106: Determine a jump rule string corresponding to the identification code based on the target regular and the resource path of the domain name of the identification code.

In a specific implementation process, the target regular can be understood as a summary of resource paths of domain names of identification codes under one type, and can be understood as a character string matching standard. The target regular generally includes to-be-matched characters, and the to-be-matched characters belong to variable characters. A specific jump rule, i.e., the jump rule string corresponding to the identification code can be determined only by determining a specific character of the identification code in the variable characters of the target regular. After the target regular is determined, the resource path of the domain name of the identification code can be compared with the target regular based on the target regular, to determine the specific character of the identification code in the variable characters of the target regular and obtain the jump rule string corresponding to the identification code. The jump rule string can be understood as a character string that matches the identification code in the target regular.

In some embodiments of the present specification, the determining a jump rule string corresponding to the identification code based on the target regular and the resource path of the domain name of the identification code can include: replacing a to-be-matched character in the target regular with a character at a location corresponding to the to-be-matched character in the resource path of the domain name of the identification code to determine the jump rule string corresponding to the identification code.

In a specific implementation process, when the jump rule string corresponding to the identification code is determined based on the target regular, the to-be-matched character in the target regular can be replaced with the character at the location corresponding to the to-be-matched character in the resource path of the domain name of the identification code. The to-be-matched character can be understood as a variable character in the regular, and can be adjusted and replaced based on a specific identification code. For example, the target regular is https://sh.1234567.com/Wap/Index/pay/kind/[a-zA-Z0-9]+/merchant/[a-zA-Z0-9]+, and it can be seen that to-be-matched characters of the target regular are "/[a-zA-Z0-9]+"; and the resource path of the domain name of the identification code in the scanning request is https://sh.1234567.com/Wap/Index/pay/kind/2/merchant/563296/sid/427287/subid/0. By matching the resource path with the target regular, it can be seen that characters that match locations of the to-be-matched characters of the target regular in the resource path are 2 and 563296. After the to-be-matched characters are replaced, the following jump rule string corresponding to the identification code can be obtained: https://sh.1234567.com/Wap/Index/pay/kind/2/merchant/563296. The jump rule string of the identification code under a target regular matching standard is determined by matching the target regular with the resource path of the domain name of the identification code, which establishes a data basis for accurate subsequent query of a jump address of the identification code.

Step 108: Query the jump address corresponding to the jump rule string from a rule library, where the rule library includes mapping relationships between jump rule strings and jump addresses.

In a specific implementation process, a rule library can be pre-created. The rule library can include different mapping relationships between jump rule strings and jump addresses, and a mapping relationship between a jump rule string and a jump address corresponding to each identification code can be determined based on a configuration parameter of a developer or a user of the identification code. Generally, a developer or a user of an identification code configures a parameter of the identification code. The parameter can generally include a jump address of the identification code. For example, a parameter configured for a certain identification code is http://abcdef.gh.com/q/02HhJkBUCofmi10000w033: appId=123. It can be seen that a jump address of the identification code is applet 123. The jump addresses corresponding to the jump rule strings can be determined based on configuration parameters of identification codes, to construct the rule library. In actual use, after the jump rule string corresponding to the current scanned identification code is obtained, the jump address corresponding to the identification code can be directly queried from the rule library, and the queried jump address can be returned to the client, so that the client can jump to a specified address based on the jump address.

In some embodiments of the present specification, the jump address can be a jump address of an applet application or can be a jump address of a web page. The applet application can be understood as an application that can be used without being downloaded and installed, can be hosted in a mobile application, and can be directly used by a user in the mobile application without being independently developed. Different applet applications can provide different services, and each applet application can satisfy a relatively simple basic service. Applet applications developed by different platforms can be popularized in applications for code scanning, to ensure universality and performance of code scanning jump.

For example, delivery platform A develops delivery program a, and delivery program a has an identification code. When a user scans the identification code of delivery program a by using payment application b developed by payment platform B, a code value of the identification code can be obtained. A domain name of the identification code can be obtained based on the code value of the identification code, and a target regular corresponding to the domain name can be obtained from a regular library. A resource path of the domain name of the identification code can be compared with the target regular to determine a jump rule string corresponding to the identification code, and then a rule library can be queried to obtain a jump address corresponding to the jump rule string. The jump address is a jump address of delivery program a. After the jump address is returned to a client that scans the identification code, a page of application b in the client can jump to a page of delivery program a.

According to the data processing method for code scanning jump provided in the embodiments of the present specification, identification codes are pre-classified based on resource paths of domain names of the identification codes, and a regular library is configured based on a classification result. When an identification code is scanned, a code value of the identification code can be obtained, and a target regular corresponding to a domain name in the code value of the identification code can be obtained based on the domain name. A resource path of the domain name of the identification code can be compared with the target regular to determine a jump rule string corresponding to the identification code, and then a rule library can be queried to obtain a jump address corresponding to the jump rule string. The regular library is configured by classifying the identification codes, which greatly reduces the quantity of configured regulars, and further reduces a data processing amount of subsequent regular loading and matching, thereby improving code scanning mapping and parsing efficiency. A mapping relationship between the identification code and the jump address can be accurately obtained by querying the rule library, thereby improving code scanning parsing accuracy.

Based on the previously described embodiments, in some embodiments of the present specification, the method further includes the following: if the domain names of the multiple identification codes include an intercepted domain name configured in the application, determining whether the intercepted domain name is a specified intercepted domain name; and if yes, a resource path of the intercepted domain name is obtained; otherwise, an identification code corresponding to the intercepted domain name is deleted.

In a specific implementation process, many platforms set intercepted domain names. The intercepted domain name can be understood as a domain name not allowed to be opened. For example, applet applications developed by platforms having a competitive relationship may not be allowed to be opened in competitor platforms of the platforms. However, developers of some applet applications do not consider platform interception when setting domain names, and the domain names may be intercepted by platforms including some applications. As a result, the applet applications cannot be popularized very well, and the use of the applet applications by users is affected. In some embodiments of the present specification, when the regular library is configured, an identification code with a domain name including an intercepted domain name configured in the application that scans the identification code can be used as a sample identification code for configuring the regular library. Certainly, not all intercepted domain names can be allowed to be opened in the application that scans the identification code, for example, some unsecured domain names, etc. In the embodiments of the present specification, the intercepted domain name needs to be a specified intercepted domain name. The domain names of the multiple identification codes are obtained. If the domain names include an intercepted domain name configured in the application that scans the identification code, it needs to be determined whether the intercepted domain name is a specified intercepted domain name. If yes, configuration of the regular library can be continued. If no, an identification code corresponding to the intercepted domain name is deleted. The specified intercepted domain name can be set based on an actual service, and is not specifically limited in the embodiments of the present specification. The specified intercepted domain name is also a domain name intercepted by the application that scans the code, and is generally an applet not allowed to be used in the application. Generally, a jump address of an identification code corresponding to the specified intercepted domain name is a web page jump address, so that a service of the applet can be used by using a web page when the application does not open the intercepted applet.

In the embodiments of the present specification, the specified intercepted domain name in the application that scans the identification code can be set as a sample for configuring the regular library. Therefore, some intercepted applets can also be opened in a form of a web page in the application, and services of the applets can be used by using web pages when the application does not open the intercepted applets, thereby preventing developers of the applet applications from configuring incorrect domain names to cause the services of the applets to be unable to be used.

Figure 2:
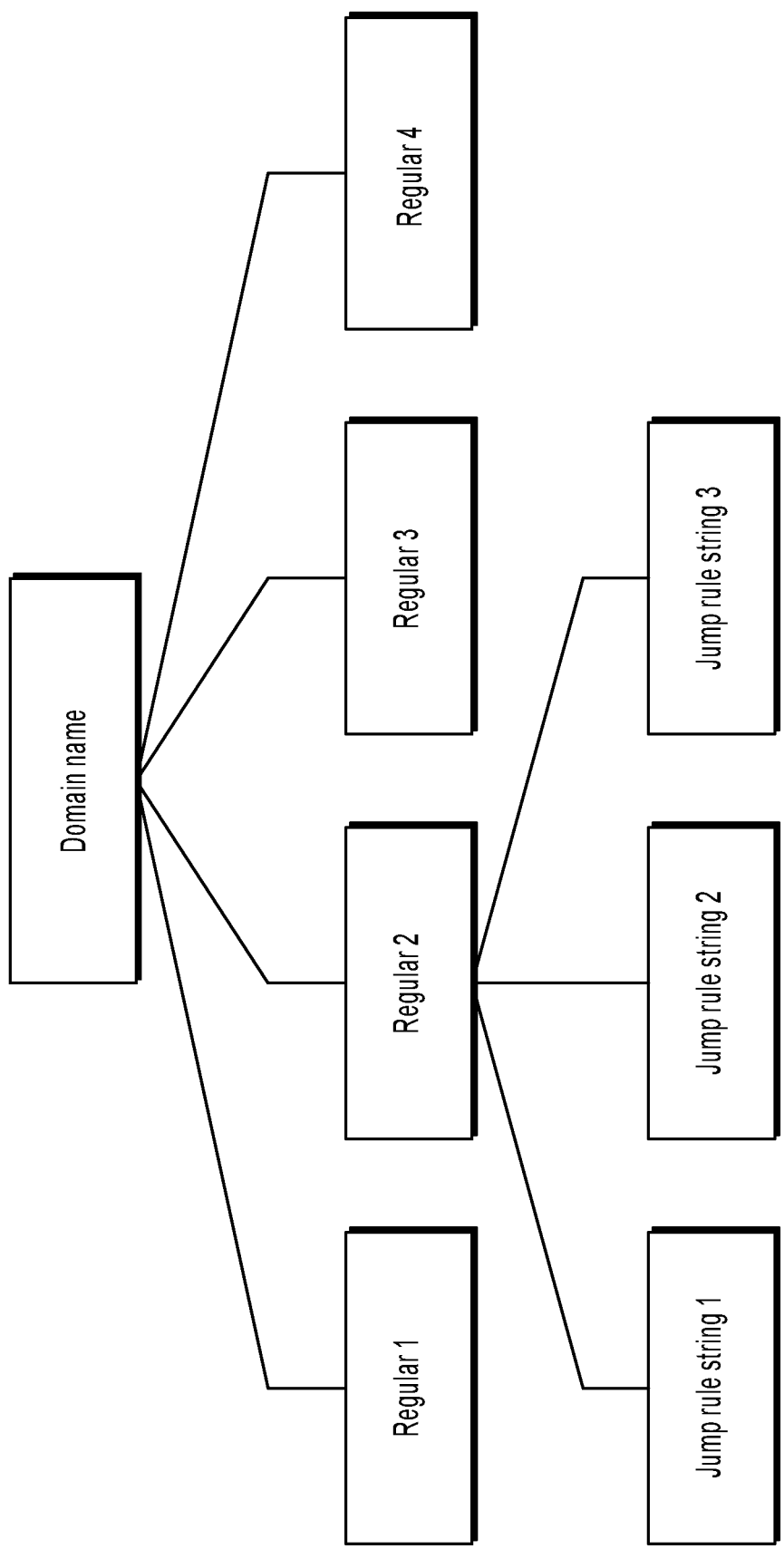
FIG. 2 is a schematic structural diagram illustrating regulars and jump rule strings, according to some embodiments of the present specification.
Figure 3:
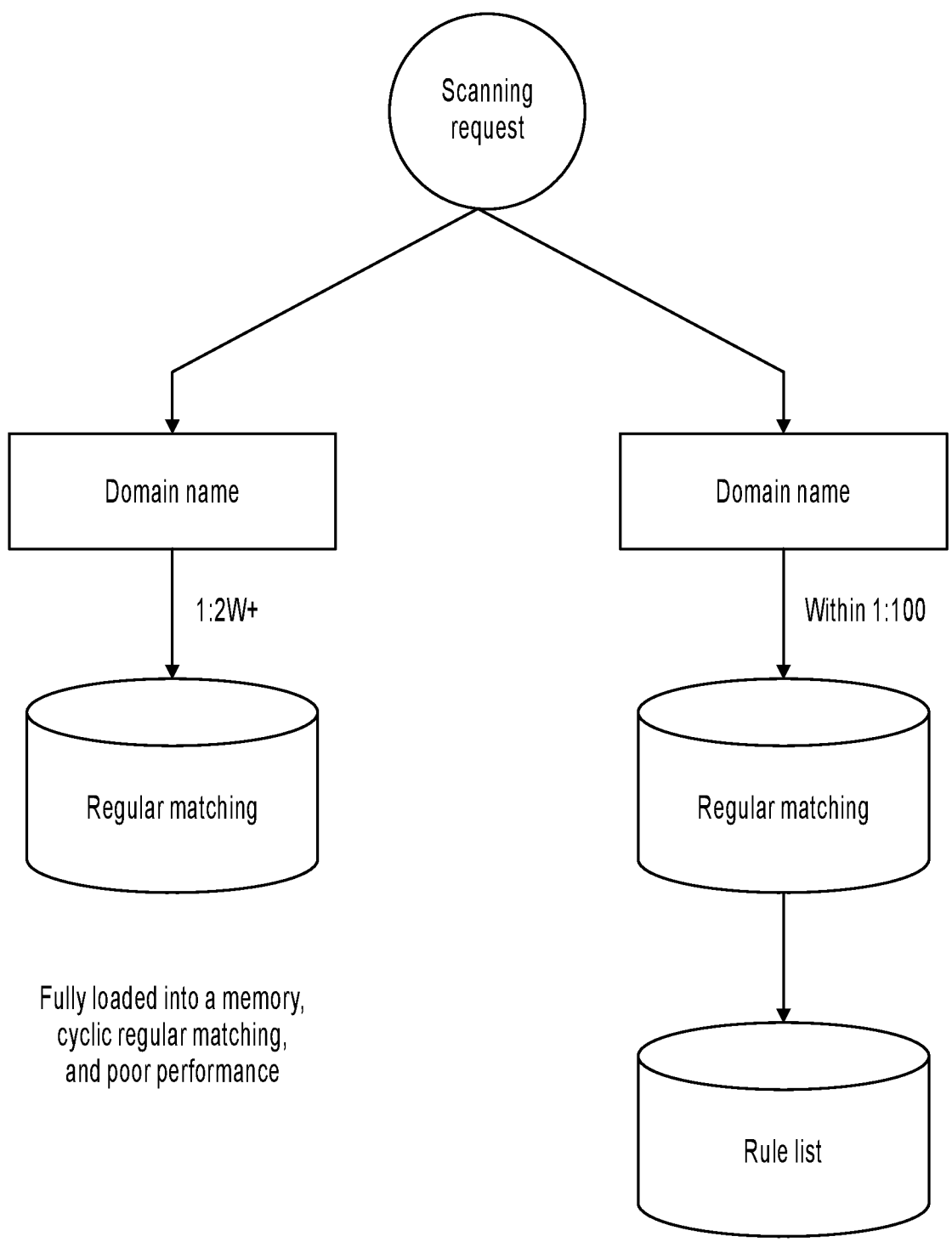
FIG. 3 is a schematic comparison flowchart illustrating data processing for code scanning jump, according to some embodiments of the present specification.

FIG. 2 is a schematic structural diagram illustrating regulars and jump rule strings, according to some embodiments of the present specification. As shown in FIG. 2, a tree hierarchical concept can be used for the regulars and the jump rule strings in the embodiments of the present specification. Regulars are preconfigured based on commonness of resource paths of domain names of identification codes, and a large quantity of general jump rules are classified. As shown in FIG. 2, one domain name can correspond to multiple regulars, and each regular can correspond to multiple jump rule strings. FIG. 3 is a schematic comparison flowchart illustrating data processing for code scanning jump, according to some embodiments of the present specification. The following describes a specific code scanning jump process in the embodiments of the present specification with reference to FIG. 2 and FIG. 3:

1. During code scanning, a domain name in a code value of an identification code can be obtained based on a scanning request.

2. All regulars, i.e., primarily-selected regulars, corresponding to the domain name can be obtained from a configured regular library. These primarily-selected regulars can be sorted based on priorities.

3. All the sorted primarily-selected regulars can be traversed based on the priorities of the primarily-selected regulars, to obtain a target regular that matches the identification code.

4. A jump rule string corresponding to the identification code can be determined based on the target regular and a resource path in the code value of the identification code, and a rule table can be queried based on the jump rule string to obtain a matched jump address.

For example, as shown in FIG. 3, the right side of FIG. 3 is a data processing process for code scanning jump in the embodiments of the present specification. A resource path in a code value of an identification code in a code scanning request is https://sh.1234567.com/Wap/Index/pay/kind/2/merchant/563296/sid/427287/subid/0config_pattern, a target regular identified based on a domain name https://sh.1234567.com/ in the scanning request is https://sh.1234567.com/Wap/Index/pay/kind/[a-zA-Z0-9]+/merchant/[a-zA-Z0-9]+, a jump rule string obtained based on the resource path and the target regular can be https://sh.1234567.com/Wap/Index/pay/kind/2/merchant/563296, and accurate query is performed in a rule library based on the jump rule string to obtain a corresponding jump address.

As shown in FIG. 2 and FIG. 3, the tree hierarchical concept is used in the embodiments of the present specification. At the first layer of the tree, commonness of resource paths corresponding to domain names is extracted to configure regulars. As such, a large quantity of previous jump rules are classified, so that very few regulars are configured. As shown in the left side of FIG. 3, if full matching is directly performed on a resource path in a code scanning request, a matching amount is relatively large and a matching proportion generally reaches at least 1:20000 (i.e., 2 W in the figure). However, in the solutions in the embodiments of the present specification, a matching proportion only needs to fall within 1:100. The embodiments of the present specification resolve a performance problem of regular loading and matching, and resolve a traversal matching performance problem for a large quantity of regulars, thereby improving mapping and parsing efficiency. Then, a mapping relationship is accurately queried from the library by using the matched jump rule string, thereby improving accuracy of code scanning jump.

The embodiments of the method in the present specification are described in a progressive way. For same or similar parts of the embodiments, mutual references can be made to the embodiments. Each embodiment focuses on a difference from other embodiments. For related parts, references can be made to some descriptions in the method embodiments.

Based on the previously described data processing method for code scanning jump, the one or more embodiments of the present specification further provide a data processing system for code scanning jump. The system can include an apparatus in combination with necessary implementation hardware, such as a system (including a distributed system), software (an application), a module, a component, a server, a client, etc. using the method in the embodiments of the present specification. Based on the same innovative concept, the apparatus in the one or more embodiments provided in the embodiments of the present specification is described in the following embodiments. Because a problem-resolving implementation solution of the apparatus is similar to the problem-resolving implementation solution of the method, for specific implementation of the apparatus in the embodiments of the present specification, references can be made to the implementation of the previously described method. No repeated description is provided. The term "unit" or "module" used below can implement a combination of software and/or hardware with a predetermined function. Although the apparatus described in the following embodiments is preferably implemented by using software, implementation of hardware or a combination of software and hardware is also possible and conceived.

Figure 4:
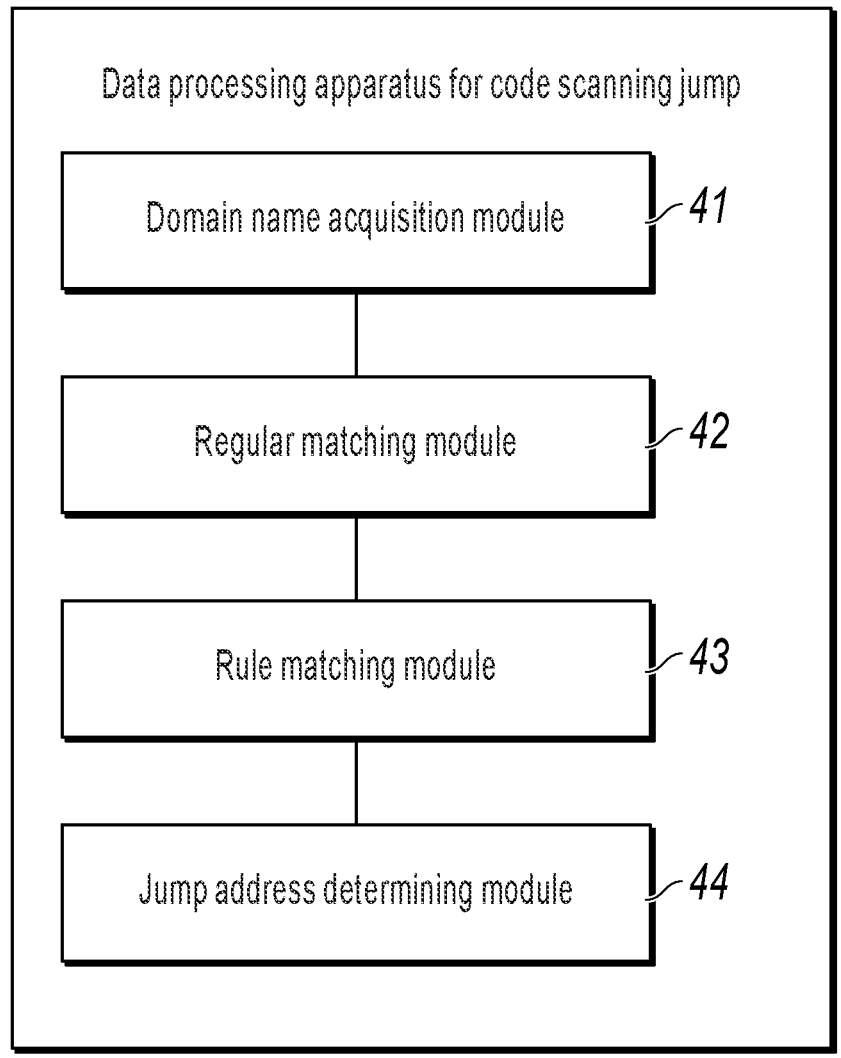
FIG. 4 is a schematic module structural diagram illustrating an embodiment of a data processing apparatus for code scanning jump, according to the present specification.

Specifically, FIG. 4 is a schematic module structural diagram illustrating an embodiment of a data processing apparatus for code scanning jump, according to the present specification. The apparatus can be the server in the previously described embodiments. As shown in FIG. 4, the data processing apparatus for code scanning jump provided in the present specification can include: a domain name acquisition module 41, configured to obtain a domain name in a code value of an identification code in a scanning request, where the identification code in the scanning request and an application that sends the scanning request do not belong to the same platform; a regular matching module 42, configured to obtain a target regular corresponding to the domain name from a regular library, where the regular library includes multiple regulars, each regular is determined and obtained based on a resource path of a domain name of a different type of identification code, and each regular includes a to-be-matched character; a rule matching module 43, configured to determine a jump rule string corresponding to the identification code based on the target regular and a resource path of the domain name of the identification code; and a jump address determining module 44, configured to query a jump address corresponding to the jump rule string from a rule library, where the rule library includes mapping relationships between jump rule strings and jump addresses.

According to the data processing apparatus for code scanning jump provided in the embodiments of the present specification, identification codes are pre-classified based on resource paths of domain names of the identification codes, and a regular library is configured based on a classification result. When an identification code is scanned, a code value of the identification code can be obtained, and a target regular corresponding to a domain name in the code value of the identification code can be obtained based on the domain name. A resource path of the domain name of the identification code can be compared with the target regular to determine a jump rule string corresponding to the identification code, and then a rule library can be queried to obtain a jump address corresponding to the jump rule string. The regular library is configured by classifying the identification codes, which greatly reduces the quantity of configured regulars, and further reduces a data processing amount of subsequent regular loading and matching, thereby improving code scanning mapping and parsing efficiency. A mapping relationship between the identification code and the jump address can be accurately obtained by querying the rule library, thereby improving code scanning parsing accuracy.

In some embodiments of the present specification, resource paths of domain names of multiple identification codes are obtained before the target regular corresponding to the domain name is obtained from the regular library; the identification codes are classified based on the resource paths of the multiple identification codes, where identification codes with resource paths including a common path are classified under one type; and a regular corresponding to each type of identification code is configured based on a common path in resource paths of identification codes under each type, to create the regular library.

The data processing apparatus for code scanning jump provided in the embodiments of the present specification classifies identification codes based on commonness of resource paths of domain names of the identification codes, thereby reducing the quantity of configured regulars and a configuration workload, improving regular matching efficiency, and further improving efficiency of code scanning jump.

In some embodiments of the present specification, the regular library construction module is specifically configured to: if the domain names of the multiple identification codes include an intercepted domain name configured in the application, determine whether the intercepted domain name is a specified intercepted domain name; and if yes, obtain a resource path of the intercepted domain name; otherwise, delete an identification code corresponding to the intercepted domain name.

The data processing apparatus for code scanning jump provided in the embodiments of the present specification can set the specified intercepted domain name in the application that scans the identification code as a sample for configuring the regular library. Therefore, some intercepted applets can also be opened in a form of a web page in the application, and services of the applets can be used by using web pages when the application does not open the intercepted applets, thereby preventing developers of the applet applications from configuring incorrect domain names to cause the services of the applets to be unable to be used.

In some embodiments of the present specification, the regular matching module is specifically configured to: obtain primarily-selected regulars that match the domain name from the regular library; and match the primarily-selected regulars with the resource path of the domain name of the identification code to obtain the target regular that matches the identification code.

In some embodiments of the present specification, the regular matching module is specifically configured to: sequentially compare the primarily-selected regulars with the resource path of the domain name of the identification code based on priorities corresponding to the primarily-selected regulars starting from a primarily-selected regular with a high priority until the matching succeeds, and use a successfully matched primarily-selected regular as the target regular.

The data processing apparatus for code scanning jump provided in the embodiments of the present specification performs the primarily-selected regular matching based on the priorities, which can improve a regular matching success rate and matching efficiency, further improve efficiency of code scanning jump, and reduce the quantity of matched regulars.

In some embodiments of the present specification, the apparatus further includes a regular priority setting module, configured to set the priorities of the primarily-selected regulars by using the following method: presetting the priorities of the primarily-selected regulars based on matching ranges of the primarily-selected regulars, where a larger matching range indicates a lower priority.

The data processing apparatus for code scanning jump provided in the embodiments of the present specification can ensure that a regular with a small matching range can be matched, and can also improve regular matching accuracy. Generally, a regular with a smaller matching range has a higher matching degree with the resource path of the domain name of the identification code.

In some embodiments of the present specification, the regular matching module is specifically configured to: replace a to-be-matched character in the target regular with a character at a location corresponding to the to-be-matched character in the resource path of the domain name of the identification code to determine the jump rule string corresponding to the identification code.

The data processing apparatus for code scanning jump provided in the embodiments of the present specification determines the jump rule string of the identification code under a target regular matching standard by matching the target regular with the resource path of the domain name of the identification code, which establishes a data basis for accurate subsequent query of a jump address of the identification code.

It is worthwhile to note that the previously described apparatus can further include other implementations based on the descriptions in the corresponding method embodiments. For specific implementations, references can be made to the descriptions in the previously described corresponding method embodiments. Details are omitted here for simplicity.

The embodiments of the present specification further provide a data processing device for code scanning jump, including at least one processor and at least one memory configured to store processor-executable instructions. The processor implements the data processing method for code scanning jump in the previously described embodiments when executing the instructions, for example: obtains a domain name in a code value of an identification code in a scanning request, where the identification code in the scanning request and an application that sends the scanning request do not belong to the same platform; obtains a target regular corresponding to the domain name from a regular library, where the regular library includes multiple regulars determined by classifying identification codes based on resource paths of domain names of the multiple identification codes, and each regular corresponds to one type of identification code; determines a jump rule string corresponding to the identification code based on the target regular and a resource path of the domain name of the identification code; and queries a jump address corresponding to the jump rule string from a rule library, where the rule library includes mapping relationships between jump rule strings and jump addresses.

The embodiments of the present specification further provide a data processing system for code scanning jump, including a server and multiple clients. An application for code scanning is installed in the client, and the client scans an identification code by using the application and sends a scanning request to the server, where the scanning request includes a code value of the scanned identification code; and the server includes at least one processor and at least one memory configured to store processor-executable instructions. The processor implements the data processing method for code scanning jump in the previously described embodiments when executing the instructions; and the server is configured to process the scanning request sent by the client by using the application and returns a jump address corresponding to the identification code, to enable the application in the client to jump to the address corresponding to the identification code.

It is worthwhile to note that the previously described device and system can further include other implementations based on the descriptions in the method embodiments. For specific implementations, references can be made to the descriptions in the related method embodiments. Details are omitted here for simplicity.

The data processing apparatus for code scanning jump provided in the present specification can also be applied to multiple data analysis and processing systems. The system, server, terminal, or device can be an independent server, or can include a terminal apparatus in combination with necessary implementation hardware, such as a server cluster, a system (including a distributed system), software (an application), an actual operation apparatus, a logic gate circuit apparatus, a quantum computer, etc. using one or more methods or one or more embodiment systems, servers, terminals, or devices of the present specification. The detection system for verifying difference data can include at least one processor and at least one memory storing computer-executable instructions. The processor implements the steps of the method in any one or more of the previously described embodiments when executing the instructions.

Figure 5:
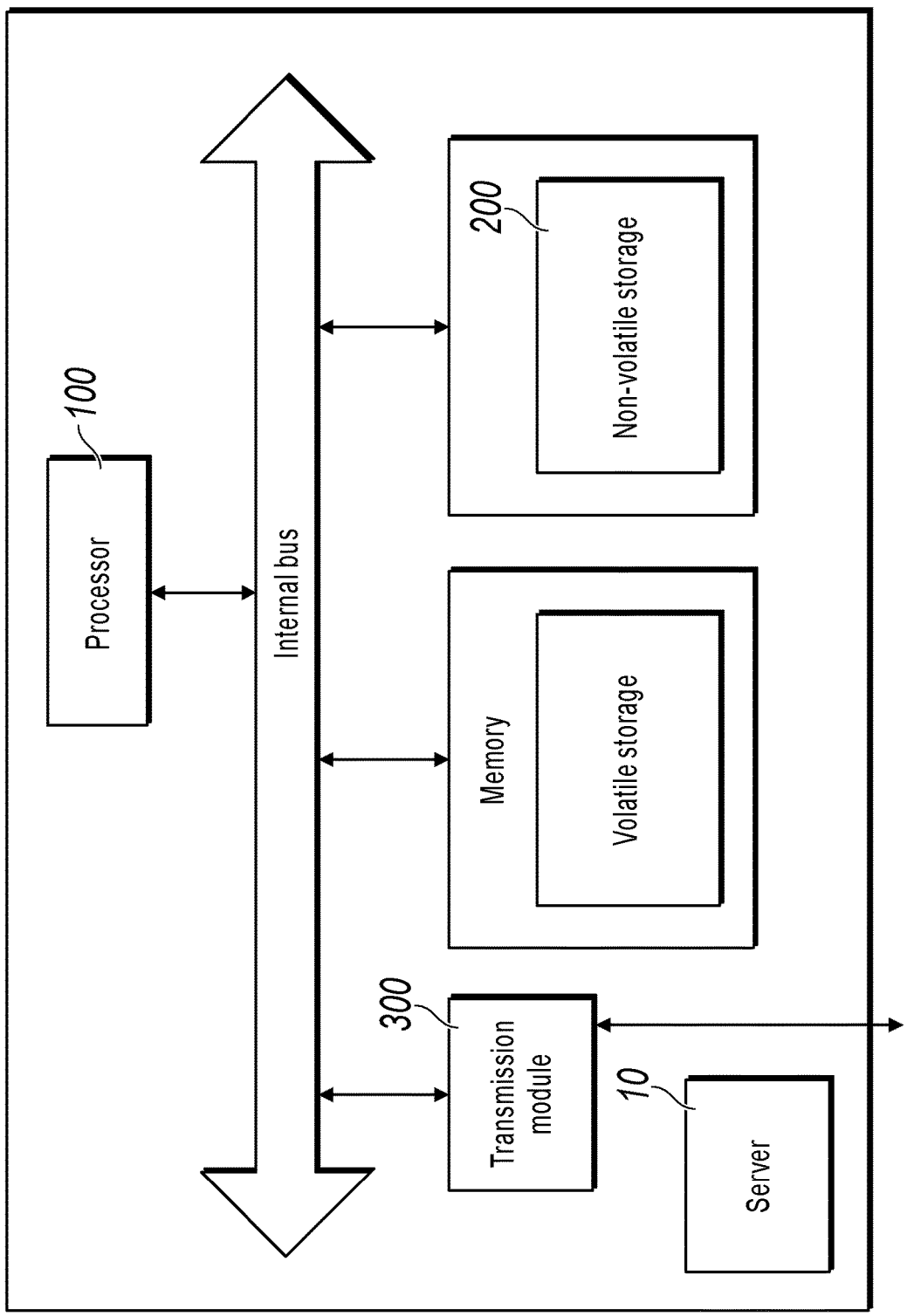
FIG. 5 is a hardware structure block diagram illustrating a data processing server for code scanning jump, according to an embodiment of the present specification.

The method embodiments provided in the embodiments of the present specification can be executed by a mobile terminal, a computer terminal, a server, or a similar operation apparatus. For example, the method embodiments run in a server. FIG. 5 is a hardware structure block diagram illustrating a data processing server for code scanning jump, according to an embodiment of the present specification. The computer terminal can be the scanning code jump data processing server or the scanning code jump data processing apparatus in the previously described embodiments. As shown in FIG. 5, a server 10 can include one or more processors 100 (only one processor is shown in the figure) (the processor 100 can include but is not limited to a processing apparatus such as a microprocessor (MCU) or a programmable logic device (FPGA)), a non-volatile storage 200 for storing data, and a transmission module 300 for a communication function. A person of ordinary skill in the art can understand that the structure shown in FIG. 5 is merely an example, and does not impose a limitation on the structure of the previously described electronic apparatus. For example, the server 10 can alternatively include more or fewer components than those components shown in FIG. 5, for example, can further include other processing hardware, such as a library or multi-level cache, and a GPU; or can have a configuration different from the configuration shown in FIG. 5.

The non-volatile storage 200 can be configured to store a software program and a module of application software, for example, a program instruction/module corresponding to the data processing method for code scanning jump in the embodiments of the present specification. The processor 100 runs the software program and the module stored in the non-volatile storage 200, to execute various functional applications and resource data updating. The non-volatile storage 200 can include a high-speed random access memory, or can include one or more magnetic storage apparatuses, flash memories, or other non-volatile solid-state storages. In some embodiments, the non-volatile storage 200 can further include storages remotely disposed relative to the processor 100, and these remote storages can be connected to a computer terminal via a network. Embodiments of the network include but are not limited to the Internet, an intranet, a local area network, a mobile communications network, and a combination thereof.

The transmission module 300 is configured to receive or send data via a network. A specific embodiment of the network can include a wireless network provided by a communications provider of a computer terminal. In an embodiment, the transmission module 300 includes a network interface controller (NIC), and the NIC can be connected to another network device by using a base station, to communicate with the Internet. In an embodiment, the transmission module 300 can be a radio frequency (RF) module, configured to communicate with the Internet in a wireless way.

Specific embodiments of the present specification are described above. Other embodiments fall within the scope of the appended claims. In some cases, the actions or steps described in the claims can be performed in an order different from the order in the embodiments and the desired results can still be achieved. In addition, the process depicted in the accompanying drawings does not necessarily need the shown particular execution order or sequence to achieve the desired results. In some implementations, multi-tasking processing and parallel processing are allowed or may be advantageous.

The method or apparatus in the previously described embodiments provided in the present specification can implement service logic by using a computer program and record the service logic in a storage medium, and the storage medium can be read and executed by a computer to implement the effects of the solutions described in the embodiments of the present specification, for example: obtain a domain name in a code value of an identification code in a scanning request, where the identification code in the scanning request and an application that sends the scanning request do not belong to the same platform; obtain a target regular corresponding to the domain name from a regular library, where the regular library includes multiple regulars determined by classifying identification codes based on resource paths of domain names of the multiple identification codes, and each regular corresponds to one type of identification code; determine a jump rule string corresponding to the identification code based on the target regular and a resource path of the domain name of the identification code; and query a jump address corresponding to the jump rule string from a rule library, where the rule library includes mapping relationships between jump rule strings and jump addresses.

The storage medium can include a physical apparatus configured to store information. The information is usually digitized and then stored by using a medium that uses an electric way, a magnetism way, an optic way, etc. The storage medium can include an apparatus for storing information in an electric energy way, for example, various memories such as a RAM or a ROM; an apparatus for storing information in a magnetic energy way, such as a hard disk, a floppy disk, a magnetic tape, a magnetic core memory, a magnetic bubble memory, or a USB disk; and an apparatus for storing information in an optical way, such as a CD or a DVD. Certainly, there are other forms of readable storage media, such as a quantum memory and a graphene memory.

The data processing method or apparatus for code scanning jump provided in the embodiments of the present specification can be implemented in a computer by a processor by executing a corresponding program instruction, for example, can be implemented at a PC end by using C++ language in a Windows operating system, can be implemented by using a Linux system, can be implemented by an intelligent terminal by using an Android or iOS system program design language, or can be implemented based on processing logic of a quantum computer.

It is worthwhile to note that the apparatus, the computer storage medium, or the system previously described in the present specification can further include other implementations based on the descriptions in the related method embodiments. For specific implementations, references can be made to the descriptions in the corresponding method embodiments. Details are omitted here for simplicity.

The embodiments of the present specification are described in a progressive way. For same or similar parts of the embodiments, mutual references can be made to the embodiments. Each embodiment focuses on a difference from other embodiments.

Especially, a hardware+program embodiment is basically similar to a method embodiment, and therefore is described briefly. For related parts, references can be made to some descriptions in the method embodiment.

The embodiments of the present specification are not necessarily limited to satisfying industry communications standards, standard computer resource data updating and storage rules, or the cases described in the one or more embodiments of the present specification. A slightly modified implementation solution obtained based on some industry standards, or in a self-defined way, or based on the implementation described in the embodiments can also implement an implementation effect that is the same as, equivalent to, or similar to the implementation effect implemented by the previously described embodiments, or an expected implementation effect obtained after transformation. Embodiments obtained by applying these modified or transformed data acquisition, storage, determining, and processing methods can still fall within the scope of optional implementation solutions of the embodiments of the present specification.

In the 1990s, whether a technical improvement is a hardware improvement (for example, an improvement of circuit structures, such as a diode, a transistor, or a switch) or a software improvement (an improvement of a method procedure) can be clearly distinguished. However, as technologies develop, current improvements of many method procedures can be considered as direct improvements on hardware circuit structures. Almost all designers program an improved method process into a hardware circuit, to obtain a corresponding hardware circuit structure. Therefore, a method process can be implemented by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without needing a chip manufacturer to design and manufacture a dedicated integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method procedure can be readily obtained provided that the method procedure is logically programmed by using several of the previously described HDLs and is programmed into an integrated circuit.

A controller can be implemented by using any appropriate method. For example, the controller can be in a form a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of the memory. A person skilled in the art should also know that, in addition to implementing the controller by using only the computer-readable program code, method steps can be logically programmed to allow the controller to implement the same function in a form of the logic gate, the switch, the ASIC, the programmable logic controller, or the built-in microcontroller. Therefore, the controller can be considered as a hardware component, and an apparatus included in the controller and configured to implement various functions can also be considered as a structure in the hardware component. Alternatively, the apparatus configured to implement various functions can even be considered as both a software module for implementing the method and a structure in the hardware component.

The system, apparatus, module, or unit illustrated in the previously described embodiments can be specifically implemented by using a computer chip or an entity, or can be implemented by using a product having a certain function. A typical implementation device is a computer. Specifically, the computer can be, for example, a personal computer, a laptop computer, a vehicle-mounted human-machine interaction device, a cellular phone, a camera phone, a smartphone, a personal digital assistant, a media player, a navigation device, an email device, a game console, a tablet computer, or a wearable device, or a combination of any of these devices.

Although the one or more embodiments of the present specification provide the operation steps of the method according to the embodiments or flowcharts, more or fewer operation steps can be included based on conventional or non-creative means. The sequence of the steps listed in the embodiments is merely one of numerous step execution sequences, and does not represent the unique execution sequence. During actual execution of an apparatus or a terminal product, the steps can be performed in the method sequence shown in the embodiments or the accompanying drawings, or performed in parallel (for example, in a parallel-processor or multi-thread processing environment, or even in a distributed resource data updating environment). The terms "include", "comprise", or their any other variants are intended to cover non-exclusive inclusion, so that a process, method, product, or device that includes a series of elements not only includes these elements, but also includes other elements not expressly listed, or further includes elements inherent to such process, method, product, or device. Without more constraints, an element preceded by "includes a . . . " does not preclude the existence of another identical element in the process, method, product or device that includes the element. The words such as "first" and "second" are used to indicate names instead of any particular order.

For ease of description, when the apparatus is described, the apparatus is divided into various modules based on functions for separate description. Certainly, when the one or more embodiments of the present specification are implemented, the functions of the modules can be implemented in one or more pieces of software and/or hardware, or modules implementing the same function can be implemented by using a combination of multiple submodules or subunits. The described apparatus embodiments are merely examples. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

The present invention is described with reference to the flowcharts and/or block diagrams of the method, the apparatus (system), and the computer program product according to the embodiments of the present invention. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable resource data updating device to generate a machine, so that the instructions executed by the computer or the processor of another programmable resource data updating device generate an apparatus for implementing a specific function in one or more processes in the flowcharts and/or in one or more blocks in the block diagrams.

Alternatively, these computer program instructions can be stored in a computer-readable memory that can instruct a computer or another programmable resource data updating device to work in a specific way, so that the instructions stored in the computer-readable memory generate a product that includes an instruction apparatus. The instruction apparatus implements a specific function in one or more processes in the flowcharts and/or in one or more blocks in the block diagrams.

Alternatively, these computer program instructions can be loaded onto a computer or another programmable resource data updating device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a non-volatile storage, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. An example of the computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, a Graphene-based storage or another magnetic storage device, or any other non-transmission medium. The computer storage medium can be configured to store information that can be accessed by a computing device. Based on the definition in the present specification, the computer-readable medium does not include computer-readable transitory media (transitory media) such as a modulated data signal and carrier.

A person skilled in the art should understand that the one or more embodiments of the present specification can be provided as a method, a system, or a computer program product. Therefore, the one or more embodiments of the present specification can use a form of hardware only embodiments, software only embodiments, or embodiments with a combination of software and hardware. In addition, the one or more embodiments of the present specification can use a form of a computer program product that is implemented on one or more computer-usable storage media (including but not limited to a magnetic disk storage, a CD-ROM, an optical storage, etc.) that include computer-usable program code.

The one or more embodiments of the present specification can be described in the general context of computer-executable instructions executed by a computer, such as a program module. Generally, the program module includes a routine, a program, an object, a component, a data structure, etc. for executing a specific task or implementing a specific abstract data type. Alternatively, the one or more embodiments of the present specification can be practiced in distributed computing environments. In these distributed computing environments, tasks are executed by remote processing devices connected via a communications network. In the distributed computing environments, the program module can be located in both local and remote computer storage media including storage devices.

The embodiments of the present specification are described in a progressive way. For same or similar parts of the embodiments, mutual references can be made to the embodiments. Each embodiment focuses on a difference from other embodiments. Especially, a system embodiment is basically similar to a method embodiment, and therefore is described briefly. For related parts, references can be made to some descriptions in the method embodiment. In the description of the present specification, reference terms such as "an embodiment", "some embodiments", "example", "specific example", and "some examples" mean that specific features, structures, materials, or characteristics described with reference to the embodiments or examples are included in at least one embodiment or example of the present specification. In the present specification, the example expressions of the terms are not necessarily specific to the same embodiment or example. In addition, the described specific features, structures, materials, or characteristics can be combined in a proper way in any one or more embodiments or examples. In addition, a person skilled in the art can integrate or combine different embodiments or examples and features of different embodiments or examples described in the present specification, provided that they do not conflict with each other.

The previous descriptions are merely implementations of the one or more embodiments of the present specification, and are not intended to limit the one or more embodiments of the present specification. For a person skilled in the art, various modifications and changes can be made to the one or more embodiments of the present specification. Any modification, equivalent replacement, improvement, etc. made within the spirit and principle of the present application shall fall within the protection scope of the claims.

What is claimed is:

1. A computer-implemented method, comprising:
   receiving, from an client application, scan data resulting from the client application having been used to scan an identification code, wherein the identification code and the client application have been created under different platforms;
   obtaining a domain name in a code value of the identification code in the scan data;
   presetting priorities corresponding to primarily-selected regular expressions, based on matching ranges of the primarily-selected regular expressions, wherein a larger matching range indicates a lower priority;
   obtaining, from a regular expression library, a target regular expression corresponding to the domain name, by matching the primarily-selected regular expressions with a resource path of the domain name to obtain the target regular expression that matches the identification code, wherein matching the primarily-selected regular expressions comprises sequentially comparing the primarily-selected regular expressions with the resource path based on the priorities corresponding to the primarily-selected regular expressions, starting from a primarily-selected regular expression with a high priority until the matching succeeds, and using a successfully matched primarily-selected regular expression as the target regular expression, wherein the regular expression library comprises multiple regular expressions, each regular expression is obtained based on a resource path of a domain name of a different type of identification code, and each regular expression comprises a to-be-matched character;
   determining a jump rule string corresponding to the identification code, based on the target regular expression and the resource path of the domain name of the identification code; and
   querying a jump address corresponding to the jump rule string from a rule library, wherein the rule library comprises mapping relationships between jump rule strings and jump addresses.

2. The computer-implemented method of claim 1, further comprising:
   before obtaining the target regular expression from the regular expression library, creating the regular expression library, wherein creating the regular expression library comprises:
   (i) obtaining resource paths of domain names of multiple different identification codes,
   (ii) classifying the multiple different identification codes based on the resource paths of the domain names of the multiple different identification codes, wherein identification codes with resource paths comprising a common path are classified under one type, and
   (iii) configuring, for each type of identification code, a regular expression corresponding to the type of identification code, based on a common path of resource paths of identification codes classified under the type.

3. The computer-implemented method of claim 2, further comprising:
   in response to at least one domain name of at least one of the multiple different identification codes comprising an intercepted domain name configured in the client application, (i) determining that the intercepted domain name is a specified intercepted domain name, and obtaining a resource path of the intercepted domain name, or (ii) determining that the intercepted domain name is not the specified intercepted domain name, and deleting an identification code corresponding to the intercepted domain name.

4. The computer-implemented method of claim 1, wherein obtaining the target regular expression corresponding to the domain name from the regular expression library comprises:
   obtaining, from the regular expression library, primarily-selected regular expressions that match the domain name.

5. The computer-implemented method of claim 1, wherein determining the jump rule string corresponding to the identification code comprises:
   replacing a to-be-matched character in the target regular expression with a character at a location corresponding to the to-be-matched character in the resource path of the domain name of the identification code.

6. A non-transitory, computer-readable medium storing one or more instructions executable by a computer system to perform operations comprising:
   receiving, from an client application, scan data resulting from the client application having been used to scan an identification code, wherein the identification code and the client application have been created under different platforms;

obtaining a domain name in a code value of the identification code in the scan data;
presetting priorities corresponding to primarily-selected regular expressions, based on matching ranges of the primarily-selected regular expressions, wherein a larger matching range indicates a lower priority;
obtaining, from a regular expression library, a target regular expression corresponding to the domain name, by matching the primarily-selected regular expressions with a resource path of the domain name to obtain the target regular expression that matches the identification code, wherein matching the primarily-selected regular expressions comprises sequentially comparing the primarily-selected regular expressions with the resource path based on the priorities corresponding to the primarily-selected regular expressions, starting from a primarily-selected regular expression with a high priority until the matching succeeds, and using a successfully matched primarily-selected regular expression as the target regular expression, wherein the regular expression library comprises multiple regular expressions, each regular expression is obtained based on a resource path of a domain name of a different type of identification code, and each regular expression comprises a to-be-matched character;
determining a jump rule string corresponding to the identification code, based on the target regular expression and the resource path of the domain name of the identification code; and
querying a jump address corresponding to the jump rule string from a rule library, wherein the rule library comprises mapping relationships between jump rule strings and jump addresses.

7. The computer-readable medium of claim 6, the operations further comprising:
before obtaining the target regular expression from the regular expression library, creating the regular expression library, wherein creating the regular expression library comprises:
(i) obtaining resource paths of domain names of multiple different identification codes,
(ii) classifying the multiple different identification codes based on the resource paths of the domain names of the multiple different identification codes, wherein identification codes with resource paths comprising a common path are classified under one type, and
(iii) configuring, for each type of identification code, a regular expression corresponding to the type of identification code, based on a common path of resource paths of identification codes classified under the type.

8. The computer-readable medium of claim 7, the operations further comprising:
in response to at least one domain name of at least one of the multiple different identification codes comprising an intercepted domain name configured in the client application, (i) determining that the intercepted domain name is a specified intercepted domain name, and obtaining a resource path of the intercepted domain name, or (ii) determining that the intercepted domain name is not the specified intercepted domain name, and deleting an identification code corresponding to the intercepted domain name.

9. The computer-readable medium of claim 6, wherein obtaining the target regular expression corresponding to the domain name from the regular expression library comprises:
obtaining, from the regular expression library, primarily-selected regular expressions that match the domain name.

10. The computer-readable medium of claim 6, wherein determining the jump rule string corresponding to the identification code comprises:
replacing a to-be-matched character in the target regular expression with a character at a location corresponding to the to-be-matched character in the resource path of the domain name of the identification code.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, from an client application, scan data resulting from the client application having been used to scan an identification code, wherein the identification code and the client application have been created under different platforms;
obtaining a domain name in a code value of the identification code in the scan data;
presetting priorities corresponding to primarily-selected regular expressions, based on matching ranges of the primarily-selected regular expressions, wherein a larger matching range indicates a lower priority;
obtaining, from a regular expression library, a target regular expression corresponding to the domain name, by matching the primarily-selected regular expressions with a resource path of the domain name to obtain the target regular expression that matches the identification code, wherein matching the primarily-selected regular expressions comprises sequentially comparing the primarily-selected regular expressions with the resource path based on the priorities corresponding to the primarily-selected regular expressions, starting from a primarily-selected regular expression with a high priority until the matching succeeds, and using a successfully matched primarily-selected regular expression as the target regular expression, wherein the regular expression library comprises multiple regular expressions, each regular expression is obtained based on a resource path of a domain name of a different type of identification code, and each regular expression comprises a to-be-matched character;
determining a jump rule string corresponding to the identification code, based on the target regular expression and the resource path of the domain name of the identification code; and
querying a jump address corresponding to the jump rule string from a rule library, wherein the rule library comprises mapping relationships between jump rule strings and jump addresses.

12. The computer-implemented system of claim 11, the operations further comprising:
before obtaining the target regular expression from the regular expression library, creating the regular expression library, wherein creating the regular expression library comprises:
(i) obtaining resource paths of domain names of multiple different identification codes, (ii) classifying the multiple different identification codes based on the resource paths of the domain names of the multiple different identification codes, wherein identification codes with resource paths comprising a common path are classified under one type, and (iii) configuring, for each type of identification code, a regular expression corresponding to the type of identification code, based on a common path of resource paths of identification codes classified under the type.

13. The computer-implemented system of claim 12, the operations further comprising:

in response to at least one domain name of at least one of the multiple different identification codes comprising an intercepted domain name configured in the client application, (i) determining that the intercepted domain name is a specified intercepted domain name, and obtaining a resource path of the intercepted domain name, or (ii) determining that the intercepted domain name is not the specified intercepted domain name, and deleting an identification code corresponding to the intercepted domain name.

14. The computer-implemented system of claim 11, wherein obtaining the target regular expression corresponding to the domain name from the regular expression library comprises:

obtaining, from the regular expression library, primarily-selected regular expressions that match the domain name.

* * * * *